(12) United States Patent
Anderson

(10) Patent No.: US 6,424,338 B1
(45) Date of Patent: Jul. 23, 2002

(54) SPEED ZONE TOUCHPAD

(75) Inventor: Glen J. Anderson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/409,775

(22) Filed: Sep. 30, 1999

(51) Int. Cl.[7] .................................................. G09G 5/00
(52) U.S. Cl. ...................... 345/173; 345/145; 345/156; 345/157; 345/158; 345/159; 345/174; 345/177; 345/179; 178/18.01; 178/18.02; 178/18.03; 178/18.04; 178/18.05
(58) Field of Search ............................. 345/173, 174, 345/179, 177, 159, 156, 157, 158, 145; 178/18.01, 18.02, 18.03, 18.04, 18.05

(56) References Cited

U.S. PATENT DOCUMENTS

| | | | |
|---|---|---|---|
| 4,914,624 A | | 4/1990 | Dunthorn .................... 364/900 |
| 5,053,758 A | | 10/1991 | Cornett et al. ............... 340/712 |
| 5,327,161 A | * | 7/1994 | Logan et al. ................ 345/157 |
| 5,613,137 A | | 3/1997 | Bertram et al. .............. 395/800 |
| 5,627,567 A | | 5/1997 | Davidson .................... 345/173 |
| 5,914,718 A | * | 6/1999 | Chiu et al. ................... 345/358 |
| 6,160,536 A | * | 12/2000 | Forest ......................... 345/157 |
| 6,215,478 B1 | * | 4/2001 | Yeh et al. .................... 345/173 |

* cited by examiner

Primary Examiner—Richard Hjerpe
Assistant Examiner—Jean Lesperance
(74) Attorney, Agent, or Firm—Mark S. Walker; Sean P. Suiter; Suiter & Associates

(57) ABSTRACT

A touchpad pointing device dynamically adjusts cursor control gain characteristics based on the x-y coordinates at which the finger first touches the touchpad for a given cursor control task. In this manner, cursor control gain such as simple cursor tracking rate or cursor acceleration profile may be optimized for each control task without changing settings. The x-y coordinates are preferably grouped into easily identifiable zones on the touchpad surface. Accordingly, a wide range of control gain is available, including very high cursor track rates where long distance cursor excursions are desired, and very low cursor tracking for tasks requiring fine cursor positioning. As a further aspect of the invention, the touchpad also allows control of other operational features such as tapping, tapping sensitivity, and button functionality, thus providing a touchpad that is highly customizable.

69 Claims, 7 Drawing Sheets

SPEED ZONE TOUCHPAD

FIELD OF THE INVENTION

The present invention relates generally to the field of computer pointing devices. More particularly, the present invention relates to an improved touch-based pointing device wherein the control gain or other operational features of the pointing device are dynamically adjusted to provide optimal performance for each pointing task.

BACKGROUND OF THE INVENTION

Although the keyboard remains the primary computer input device in a computer system, the prevalence of graphical user interfaces (GUIs) virtually requires the use of a mouse or other pointing device. A variety of pointing devices are known, including the mouse, trackball, joystick, and touchpad. Each of the aforementioned types of pointing devices have their own attendant advantages and disadvantages.

A mouse uses a roller ball and rollers for translating x- and y-axis movement of the mouse to x-y movement of an on-screen pointer. A mouse typically has a hand-sized housing and is operated by moving the mouse around on a flat surface such as a desktop or mouse pad. Common mechanisms for generating an electrical signal representative of x-y movement include opto-mechanical mechanisms which operate by means of rotating disks having radial slits and optical mechanisms which interpret variations in reflectance as the mouse is moved over a special grid. A mouse typically has one or more buttons located on the housing for activating various software features.

A major advantage of the mouse is that its use is fairly intuitive. However, drawbacks to the mouse have led to the development of alternative pointing devices. One drawback is the space required for a mouse. Because the mouse is not a stationary device, a relatively large amount of desktop space is required. Additionally, the mouse is generally not suitable for use with a portable computer because many mobile settings lack of a suitable operating surface.

The trackball somewhat alleviates the problems of the mouse. A trackball is essentially reversed from a mouse. The trackball employs a roller ball in a stationary housing and the cursor is controlled by turning the roller ball directly with the hand. Because the trackball is stationary, freestanding units typically require less desktop space than a mouse. Also, the stationary nature of the trackball makes it suitable for incorporation into the housing of a device such as a keyboard or portable computer. Trackballs often employ a large roller ball to achieve accurate cursor movement and ease of manipulation. This, however, requires a larger footprint and is suitable only where there are few or no space constraints. Trackballs may be reduced in size to accommodate the space limitations of a portable computer, however, the ergonomics and accuracy of small trackballs may be less than desired.

Small joystick-like pointing devices are also known. Such devices essentially have no footprint in that they may be located between the keys of a keyboard. These devices are operated by pushing a small stick or knob in the direction of desired cursor movement. Pressure transducers sense the direction of the push and move the cursor in the corresponding direction. Some devices sense the magnitude of the force as well as the direction of the force. In this manner, a user can control cursor speed by using varying degrees of force. Although such built-in pointing devices find widespread use in portable computers due to their almost nonexistent space requirements, they are more awkward than a mouse or trackball, particularly where fine cursor control is required. Also, the associated buttons are somewhat remotely located from the stick, making generating mouse clicks more difficult. This is especially so for pointer control tasks requiring a button press and x-y pointer movement to be performed simultaneously.

Touchpads are very intuitive pointing devices that eliminate many of the problems of the previously mentioned devices. Touchpads are stationary and compact, making them well suited for use as a built-in device for portable computers or keyboards. Touchpads are equally well suited for use as a self-contained, small footprint mouse alternative in desktop systems. Touchpads are flat, rectangular, stationary devices and typically employ a grid or matrix of capacitance sensors underneath a protective surface. Touchpads responding to direct pressure, e.g., using layered conductive or resistive sheets, are also known. Capacitance sensing touchpads sense the additional capacitance of a user's finger, but not a stylus, fingernail, pen, pencil, etc. Capacitance sensing touchpads may be used with a conductive stylus, pen, or brush-type device. Capacitance sensing touchpads may also be adapted for use with a nonconductive stylus by providing a conductive layer that is separated from the sensor matrix by a resilient compressible layer such as a foam, gel, or the like. Pressure exerted by the nonconductive stylus moves the conductive material into closer proximity of the sensor matrix as the resilient material is compressed.

Touchpads let a user control the cursor with only finger movement and require virtually none of the arm movement that a mouse or trackball demands. Touchpads also generally require no downward pressure. In fact, the capacitive effect of a finger may be sensed when it is near, but not touching the surface. Touchpads may be made pressure sensitive by sensing the surface area covered by a user's finger and interpreting the finger contact surface area as an indicium of the pressure exerted. This may be used to control, for example, pen or brush stroke width in a graphic creation software application environment, or to determine whether the necessary tapping force threshold for generating a mouse click is achieved.

As a user's fingertip is moved across the surface of a touchpad, the x-y movement is translated and the cursor follows the movement. Touchpads are primarily used as relative positioning devices and, accordingly, it is the change in x-y position that is tracked. Touchpads are certainly capable of being operated as absolute positioning devices wherein every position on the sensing surface corresponds to an absolute screen location in much the same manner as most drawing or digitizing tablets and touch screen overlays. However, given the typically small size of touchpads, an absolute positioning touchpad would have a very low resolution.

Mouse click commands may be emulated by tapping a finger on the touchpad surface. Buttons for generating mouse clicks are typically also provided. Buttons may be located on the housing of a free standing device or on the housing of a keyboard or portable computer having an integrated touchpad. Taps can also be performed by a switch responsive to downward pressure positioned underneath the touchpad surface. Touchpads are also advantageous as pointing devices in that they are typically very well sealed against environmental factors such as moisture, dirt, and debris.

One of the major advantages of the touchpad is its compact footprint. The size of a touchpad will typically be rectangular, approximately 1.5–2 inches by 3–5 inches. This compact size creates additional difficulties, however.

A control gain is associated with the touchpad. A touchpad's surface is representative of a real space overlapping the monitor. By increasing or decreasing the control gain, the size of this real space is varied. By setting the gain very low, the size of the real space is adjusted to be smaller than the entire screen. A movement on the touchpad is translated into a relatively fine movement on the screen, allowing fine cursor control. When adjusted very fine, however, the touchpad may not cover the real space corresponding to the entire screen. A user may be forced to drag an object until reaching the edge of the touchpad and then release the object to reposition his/her finger on the touchpad. This can result in objects being dropped in undesirable locations and losing other highlighted work.

Adjusting the gain too high has similar shortcomings. If the gain is adjusted high, the real space corresponding to the touchpad exceeds the size of the screen. A user can easily move objects across the entire screen. However, due to the decreased resolution of the touchpad, it can become quite difficult to locate the cursor over a particular location on the screen. Without the fine cursor control, it becomes difficult to accurately place objects on the screen.

Numerous attempts have been made to configure touchpad control gain to accommodate both gross and fine cursor movements. One such attempt is to provide a feature known as acceleration. Acceleration allows the control gain to be dynamically varied as a function of the rate of finger movement on the sensing surface. Thus, when a finger is moved very fast across the touchpad surface, the resulting on-screen movement is governed by a high control gain. In this manner, the distance of on-screen movement is high relative to the distance the finger is moved. Likewise, when a finger is moved very slowly on the touchpad, the resulting on-screen movement is governed by a low control gain. With slow finger movement, the on-screen movement may be the same as or less than distance the finger is moved. Typical driver software includes a user-adjustable parameter for choosing from several acceleration levels.

Although cursor acceleration is preferable to a simple control gain setting, it still has several drawbacks. For example, extremely high finger speeds employed in attempts to trigger the highest control gain of the acceleration profile may lack control and thus may result in erratic cursor behavior. Since acceleration represents a compromise that is optimal for neither fine nor gross control, users often become frustrated with even the best touchpads and switch to using a mouse whenever possible, especially for tasks requiring very fine cursor positioning such as graphics creation.

Touchpad users have exploited the properties of cursor acceleration in unique ways to accomplish long distance cursor excursions. Such methods are inconvenient or difficult to perform. Such methods do, however, illustrate the shortcomings of the prior art acceleration schemes and the need for an improved method for dynamically configuring touchpad control gain. One of such methods involves swishing the finger over the touchpad surface at alternating fast and slow rates. As stated above, acceleration represents a compromise that is optimal for neither extremely large nor small movements. Thus, traversing the entire length or width of the screen is generally not possible with touchpads using acceleration. In those cases where it would be undesirable to lift the finger from the touchpad surface, as where selected objects would be prematurely dropped, a user can take advantage of the acceleration feature to avoid lifting the finger. In performing the finger swishing technique, the finger is moved fast in the desired direction and slow in the opposite direction. As a result of the different finger speeds, there will be a net cursor movement in the desired direction. This process is repeated until the cursor arrives at the desired location on the screen. This approach requires multiple physical actions by the user and is, at best, clumsy.

Another method wherein acceleration may be exploited to move the cursor long distances involves the use of two fingers to cause the cursor to jump or move very quickly to a distant on-screen location. In performing this technique a first finger is placed on the touchpad followed very quickly by a second finger placed some distance from the first finger. The fingers are placed so that they are aligned in the direction of desired cursor movement. With practice, the two touches can be timed so that they are interpreted as though one finger covered the distance very quickly. As a result, the cursor movement is governed by a very high control gain and the cursor travels very quickly to the edge of the screen. However, this technique lacks precision even when skillfully executed and is unsuitable for users not capable of precise manipulations.

Several other attempts to overcome the problems associated with small touchpads have been made, but none is entirely satisfactory. For example, software may be provided that allows a user to define certain locations on the screen as "jump to" points. The cursor will jump to the nearest defined point when the cursor is moved in that direction. This method, however, is limited to the jump to points designated and requires that the user keep these spots in mind. The cursor may also inadvertently jump to a predefined point during cursor movement when it is not desired to do so.

Software features that allow a user to customize settings for individual applications are also known. Settings include cursor control gain settings, as well as button functions and other features. Thus, in a graphics application where the predominant cursor or pointer activity will require fine control, a user may store touchpad settings to be loaded automatically when that application becomes active. However, this method requires that the user setup and store the settings on an application by application basis. Also, few applications lend themselves well to a single or limited range of touchpad rates.

Software providing what is known as an "edge extension" or "edge glide" feature is also known. With edge extension, the cursor will continue to move along its present course when a user's finger reaches the edge of the touchpad surface. The movement continues so long as the finger is held at the edge of the touchpad surface.

Drag-lock features are also known. Features of this type typically lock any selected items in a selected state. Once locked, the removal of the finger during a dragging procedure will not cause the selected items to become deselected. The feature is typically invoked by a button/pad combination. Where a user is required to perform a simultaneous button click and sliding manipulation, such as holding down a touchpad function button with one finger while sliding the other finger, it may become difficult to control the cursor or hold the button.

Software may also be provided that keeps an item in a selected state for a predetermined period of time after a finger is lifted. This length of time, which may be specified by the user, gives a user time to reposition the finger and continue dragging. This feature is useful when the user's finger runs into the edge of the touchpad before the pointer is brought to the desired location. Although this feature gets around the problem of prematurely dropping items, it does not solve the underlying problem of a nonoptimal control gain. Also, a user is still required to perform two physical actions to bring the cursor to the desired location.

The prior art solutions to the difficulties associated with small touchpads remedy only the individual symptoms of a less than optimal control gain setting. Thus, there exists a need in the art for a solution that addresses the underlying problem of nonoptimal control gain by dynamically optimizing the control gain configuration for each cursor movement. There does not exist a touchpad configuration system that dynamically configures the control gain characteristics to provide optimal cursor control for all types of movements.

It would, therefore, be desirable to provide a touchpad configuration method and touchpad employing the same wherein the touchpad control gain is dynamically configured based on touchpad input to provide a control gain configuration that is optimal for the desired type of cursor movement.

SUMMARY OF THE INVENTION

In a first aspect of the present invention, an improved touchpad apparatus and control gain configuration method are provided wherein the touchpad control gain configuration is automatically adjusted on the basis of direct touchpad input. The present invention makes available a wide range of control gains, including very high cursor track rates where long distance cursor excursions are desired and very good control of fine cursor movements when fine cursor positioning is required. The present invention does so without the need to manually change settings and allows a user to directly select the desired control gain to match the pointer control situation.

In a second aspect of the present invention, other operational features of the touchpad may be controlled, varied, or configured on the basis of touchpad input. Examples of such touchpad operational features include, but are not limited to (1) tapping force or pressure sensitivity (i.e., the force required for a tap on the touchpad surface to register as a mouse click), (2) tapping speed sensitivity (i.e., the maximum time interval between consecutive taps in which the taps will be recognized as a tap sequence rather than discrete taps), (3) tapping lateral motion sensitivity (i.e., the distance on the touchpad that the finger may move between taps and still be recognized as a tapping sequence), (4) finger or stylus pressure sensitivity, and (5) the assignment of functions to buttons, taps and other pad gestures, button/pad combinations, and the like. The control of such operational features includes the enabling, disabling, or variation of any one or more of such features, preferably according to user-adjustable settings.

In accordance with the present invention, the touchpad surface is divided into a plurality of zones or regions. The dynamic configuration of control gain and/or other operational features in accordance with the present invention is made according to the region in which the finger or stylus initially touches down.

The present invention provides the advantage of instant user control over touchpad control gain or other operational features. The present invention provides an advantage over simple acceleration schemes in that fast and possibly erratic finger movements are not required to obtain the highest tracking rates, nor must finger movements remain slow to retain tracking rates suited for fine cursor control.

The present invention provides the advantage of allowing a user to choose the control gain configuration in a manner that is more direct and intuitive than current touchpads. The present invention also provides instant access to a much wider range of control gain settings than is possible with current systems.

These and numerous other advantages of the present invention are provided by an improved touchpad pointing device wherein the cursor control gain configuration is determined by the x-y coordinates at which the finger first touches the touchpad surface at the beginning of a given cursor movement. In another aspect of the invention, other operational features of the touchpad may be similarly controlled on the basis of the x-y coordinates at which the finger first touches the touchpad for a given cursor movement.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1A:
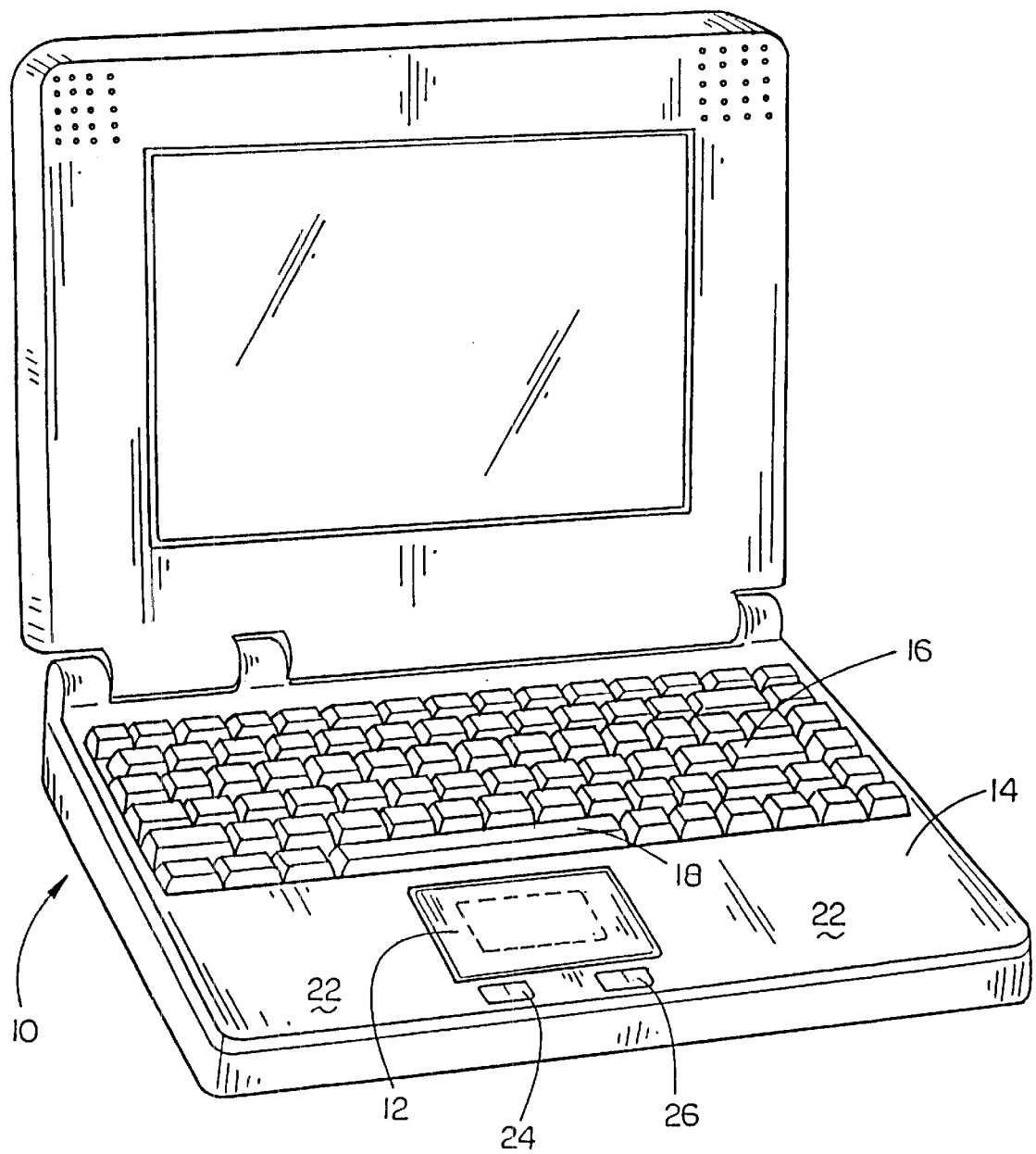
FIG. 1A shows a portable computer incorporating the speed zone touchpad according to the present invention.

As used herein, the terms "control gain" and "tracking rate" refer to the ratio of the distance of on-screen cursor movement to the distance of finger movement on the touchpad. A high tracking rate causes a cursor movement that is much greater than the distance the finger is moved and is suitable for gross cursor movements. A preferred high tracking rate allows the cursor to traverse substantially the entire height or width of the screen in a single pass across the touchpad. Conversely, a low tracking rate causes a cursor movement that is less than, or only slightly greater than, the distance the finger is moved. A preferred low tracking rate is, for example, one wherein the ratio of cursor movement to finger movement is about 1:1 and lower.

The term "acceleration" refers to a velocity-based control gain setting wherein the tracking rate is dynamically adjusted according to the speed of finger movement on the touchpad surface. The terms "acceleration rate" and "acceleration profile" refer to how greatly the touchpad tracking rate varies as a function of finger speed, i.e., the shape of the generally positive curve or line representing tracking rate as a function of finger speed. The terms "simple rate," "simple tracking rate," and "simple cursor tracking" refer to a constant control gain implemented on a touchpad that does not vary as a function of finger speed. A simple tracking rate can be said to have an acceleration of zero.

The terms "control gain configuration" or "control gain setting" are general terms relating to cursor tracking versus finger movement, and are intended to encompass both simple and acceleration rates. A preferred high control gain configuration is either a preferred high simple tracking rate as defined above or an acceleration rate wherein such preferred high tracking rates are readily achievable. A preferred low control gain setting is either a preferred low simple tracking rate as defined above, or an acceleration rate wherein such preferred low tracking rates are readily achievable.

The terms "cursor" and "pointer" are used interchangeably herein and are intended to refer to a visually distinct mark on a display which is capable of on-screen movement that generally echos the movement of a finger on a touchpad. The location of the mark on the display indicates the point at which an input action will occur. Input actions include, but are not limited to, (1) button, menu, window, text, dialog box, or icon selection; (2) selecting or running an executable program; (3) selecting or opening a file, document or other object; or (4) selecting the location where pasted or newly typed text or graphical information will be inserted.

Although the present invention will be discussed primarily in terms of finger operated touchpads, it is to be understood that any other type of touchpad device may be employed herein.

The touchpad according to the present invention is divided into a plurality of regions, referred to herein as speed zones. Each speed zone corresponds to a specific and preferably contiguous set of x-y coordinates on the touchpad sensor plane. Each speed zone is further associated with a specific control gain configuration. In a further aspect of the present invention, each speed zone may also be associated with specific settings for touchpad operational features other than cursor control gain.

When a finger is placed on the touchpad according to the present invention, the touchpad is automatically configured to the particular control gain configuration associated with the speed zone in which the initial finger contact is made. In this manner, a control gain configuration that is optimized for the type of cursor excursion desired is conveniently selected by initial finger placement. The control gain setting may be either a predefined acceleration profile or a predetermined simple rate.

After the initial finger touch down, the assigned control gain configuration governs the entire touchpad surface for the duration of the cursor excursion, i.e., until a finger lift event occurs. A finger lift event may be any detected removal of the finger from the sensing plane. Alternatively, a finger lift event may be deemed to have occurred only after the finger has been lifted for some predetermined time period. No effect on the control gain configuration will result from the finger crossing into other speed zones while directing the cursor after the initial finger contact so long as no finger lift event occurs.

In a preferred embodiment according to the present invention, an outer speed zone is located around the perimeter of the touchpad sensing plane and is associated with a high control gain configuration. By initially placing a finger in the outer speed zone, a user may generate long distance on-screen movements with relatively small finger movements. An inner speed zone is located interiorly of and is bounded by the outer speed zone. The inner speed zone is associated with a low control gain configuration, thus enabling a user to produce fine cursor movements by originating the cursor movement from within the inner speed zone.

In a particularly preferred embodiment of the present invention, three concentric speed zones are provided. An outer speed zone located around the perimeter of the touchpad is associated with a high or very high control gain configuration. An intermediate speed zone located interiorly of the outer speed zone is associated with an intermediate control gain configuration. An inner speed zone located at the center of the touchpad and interiorly of the intermediate speed zone is associated with a low or very low control gain setting.

In another preferred embodiment, the touchpad may be covered with a continuum of speed zones with control gains ranging from low to high, preferably with the lowest control gains corresponding to the center of the touchpad and the highest control gains corresponding to the outer portion of the touchpad.

Different speed zone configurations than is found in the embodiments herein are contemplated as well. Other contemplated speed zone configurations include different numbers of speed zones, including four, five, six, and higher. Other contemplated configurations also include different speed zone arrangements and layouts and it will be recognized that any region of the touchpad sensing surface may be associated with a particular control gain configuration for the purposes of the present invention. However, it is most advantageous to associate the low control gain settings near the center of the touchpad and the high control gain settings with the outer region of the touchpad. In this manner, the use of the speed zones according to the present invention corresponds to the existing behavior of experienced touchpad users. When users plan to move a cursor a long distance, they tend to place the finger near the touchpad's perimeter to allow maximum travel distance of the finger. When users plan to make fine cursor movements, they tend to place the finger closer to the middle of the touchpad.

The present invention preferably allows a user to adjust the control gain characteristics and/or other operational settings for each speed zone. In another aspect of the invention, the size of each speed zone may optionally be user adjustable. In yet another aspect of the present invention, the touchpad surface provides visual and/or tactile cues to provide a sensory indication of the speed zone borders. In another aspect, the present invention comprises a touchpad device driver in machine readable form capable of converting existing prior art touchpads into speed zone touchpads according to the present invention. In still another aspect, different control gain settings and/or other operational settings associated with each speed zone may be selected and stored for different software applications.

Referring now to the drawings, FIG. 1A shows a typical notebook computer 10 incorporating the speed zone touchpad 12 according to the present invention. Touchpad 12 is generally planar and rectangular in shape and accessible through an aperture in housing 14 of computer 10. In the embodiment shown, the touchpad 12 is advantageously located beneath space bar 18 of keyboard 16. Although other configurations are possible, the configuration shown is advantageous in that area 22 may be used as a wrist rest during keyboard entry.

Figure 1B:
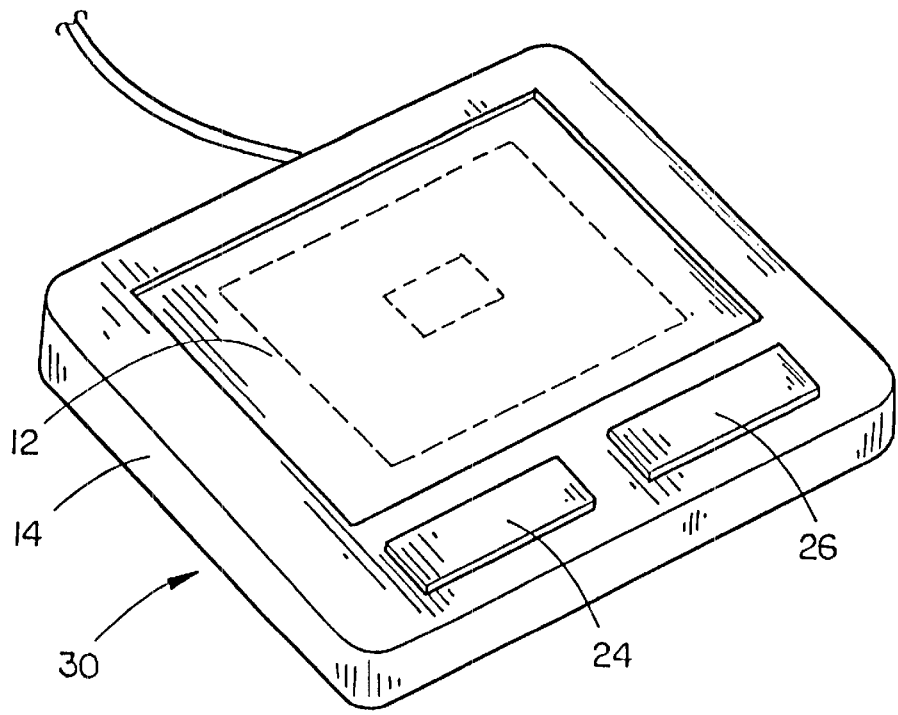
FIG. 1B shows a speed zone touchpad which may be employed as a replacement for a mouse.

FIG. 1B shows a touchpad 30 which is suitable for use as a pointing device on a desktop or other surface as a mouse replacement, such as alongside the keyboard of a desktop system (not shown) or alongside a portable computer. The touchpad device 30 comprises a touchpad surface 12 bounded by a housing shell 14 encasing the touchpad components.

Figure 1C:
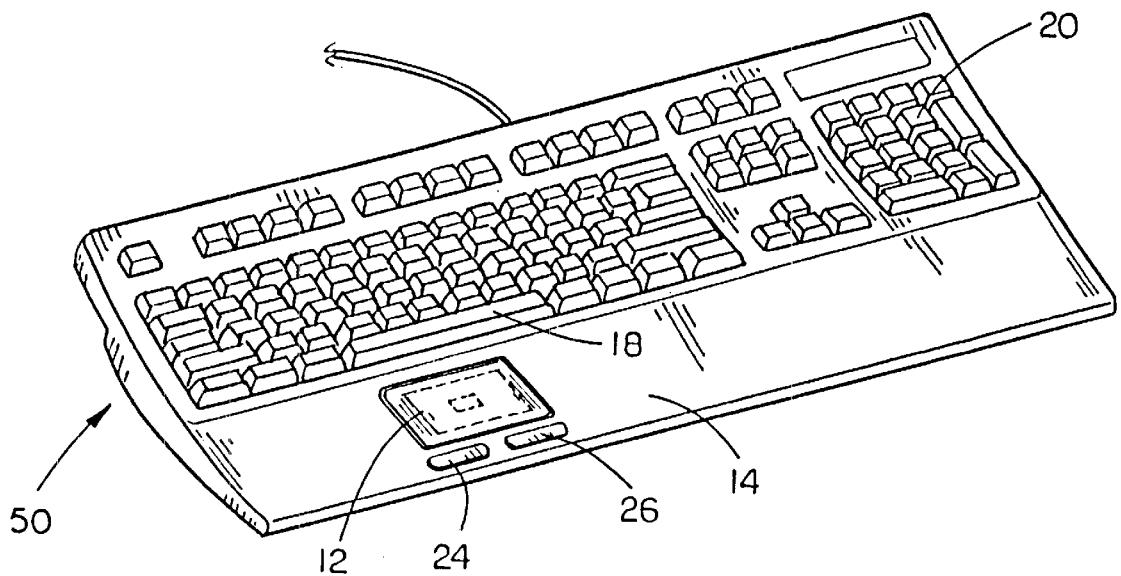
FIG. 1C shows a keyboard for a desktop computer system incorporating the speed zone touchpad according to the present invention.

FIG. 1C shows yet another embodiment of the touchpad according to the present invention wherein computer keyboard 50 incorporates a built-in speed zone touchpad 12 according to the present invention. Touchpad 12 is depicted as bounded by, and appearing through, an aperture in housing 14 of keyboard 50. In the embodiment shown, the touchpad 12 is advantageously located beneath space bar 18, although other locations are possible. For example, touchpad 12 may be placed to either side, such as beneath numeric keypad area 20.

Referring now to FIGS. 1A, 1B, and 1C, the touchpads according to the present invention are preferably utilized with buttons 24 and 26. The state of the buttons is read and the information is sent to the host computer along with x-y position tracking information. Buttons 24 and 26 may correspond to left (primary) and right (secondary) mouse buttons, which may operate according to conventions specified for such buttons by the operating system or other software application environment. The touchpad may also be employed with one or more additional buttons (not shown), for example, to function as a third or center mouse button. A third mouse button may be utilized for selecting tertiary functions which may operate according to conventions specified by the operating system or other software application environment. Such additional buttons may also perform window scrolling, user assignable functions, or may execute keystrokes, macros, and the like. Likewise, computer systems utilizing single button pointing devices are known in the art. Accordingly, in implementing the touchpad according to the present invention in such systems, only a single button is needed.

In a preferred embodiment, mouse click commands such as single clicks, double clicks, and higher, may be generated through tapping on the touchpad surface. For users who prefer to generate mouse clicks via tapping on the touchpad surface, dedicated mouse click buttons may be redundant. Thus, it is preferable to allow the buttons to be user assignable for the execution of special functions, keystrokes, macros, or button-touchpad combinations. While intended to be neither limiting nor exhaustive, exemplary basic tapping commands may include (1) a single tap corresponding to a single mouse click, (2) a double tap corresponding to a double mouse click, and (3) a double tap wherein the finger remains on the surface after the second tap, corresponding to a mouse down or a click and hold command. The buttons may also be employed in conjunction with such tapping gestures to select which mouse button the taps will emulate. Also, the meaning of the taps or button clicks may optionally be modified by simultaneously holding down certain keys of the keyboard.

Figure 2:
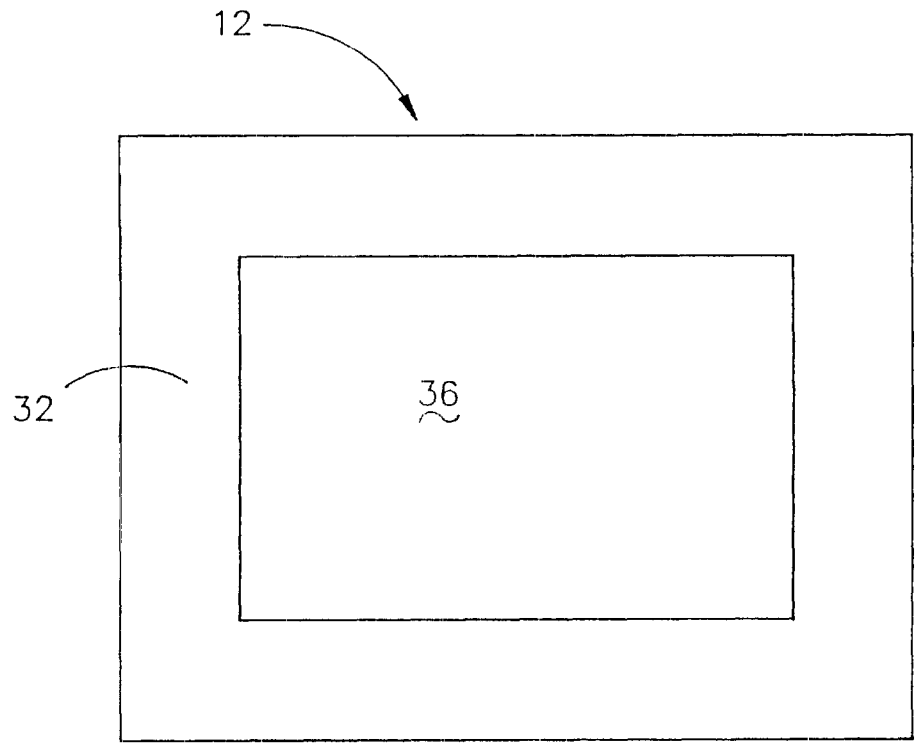
FIG. 2 shows an embodiment according to the present invention having dual speed zones.
Figure 3:
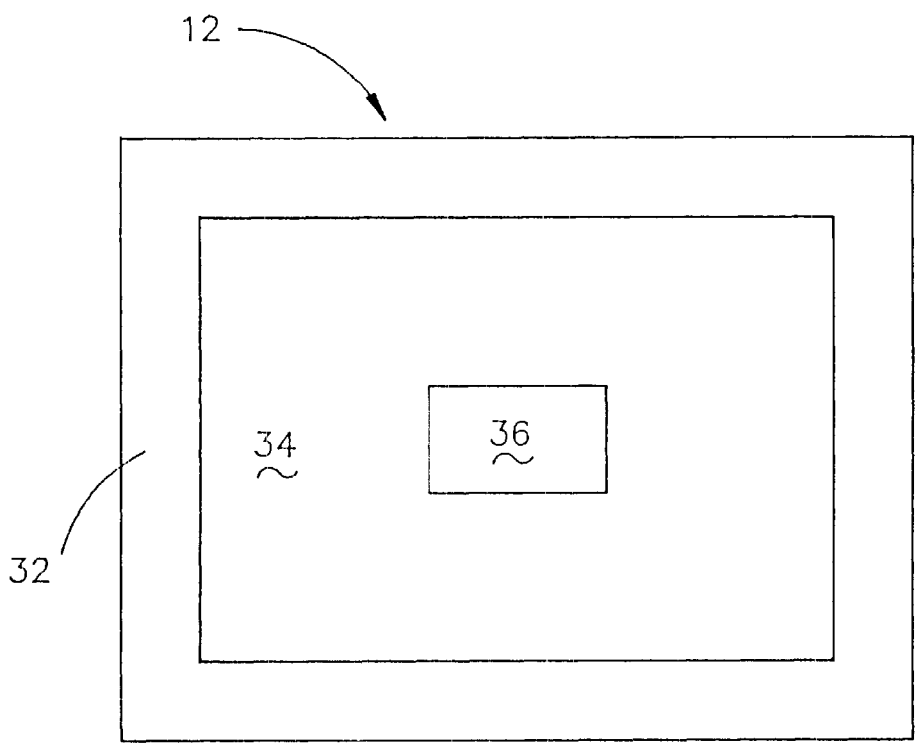
FIG. 3 shows a particularly preferred embodiment according to the present invention having three speed zones.
Figure 4:
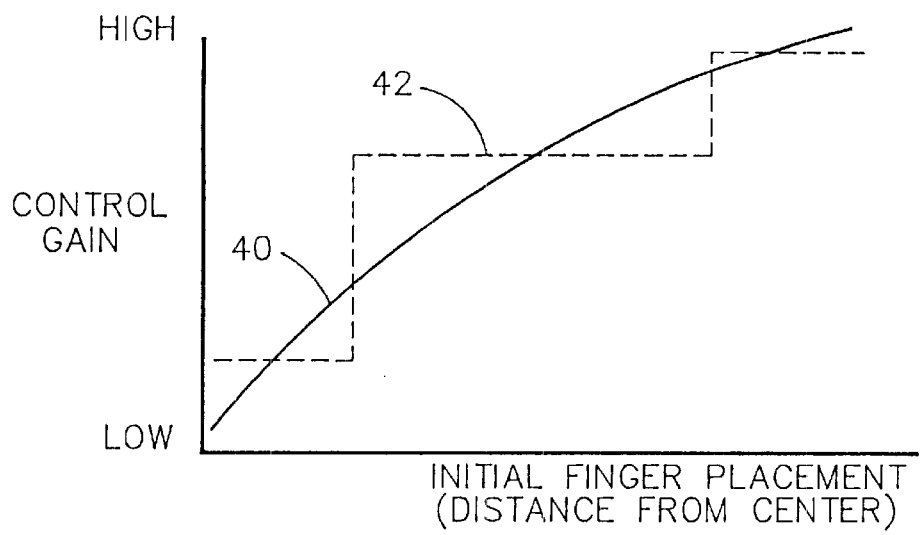
FIG. 4 is a graph of control gain as a function of finger touch down position in an embodiment according to the present invention wherein the touchpad represents a continuum of speed zones.

The speed zones of the touchpads as exemplified in FIGS. 1A, 1B, and 1C are now discussed in greater detail in reference to FIGS. 2–4. In FIG. 2, the speed zones according to the present invention are defined by concentric areas 32 and 36 wherein each of the areas is associated with a different control gain configuration. In FIG. 3, three speed zones defined by concentric areas 32, 34, and 36 are depicted wherein each of the areas is associated with different control gain characteristics. The control gain configuration may be an acceleration rate or simple tracking rate and is preferably user selectable or adjustable. For example, a user may select for each speed zone whether a simple tracking rate or an acceleration-based control gain is used. Also, a user may select the tracking rate or acceleration profile for each speed zone. In a preferred embodiment, a user may elect to disable the speed zone functionality to provide conventional functionality, or to reduce the number of speed zones. For example, where user control of control gain characteristics for each speed zone is provided, the number of speed zones may be reduced when a user assigns adjacent speed zones with identical control gain characteristics.

The control gain characteristics for a given cursor excursion are assigned according to the speed zone in which the initial finger touch down is made, The control gain configuration associated with that speed zone is then maintained for the duration of the cursor excursion, even if the finger subsequently crosses into the other speed zones. If a finger lift event occurs, a subsequent cursor excursion will be governed by the speed zone of the next finger touch down. A finger lift event may be defined as simply any removal of the finger from the touchpad, no matter how brief. In a preferred embodiment, however, a finger lift event will not be deemed to have occurred until the finger has been removed for some prespecified time interval. In that case, a user may relocate his or her finger within the predetermined time period without changing the control gain characteristics. The time period should be long enough to allow a user to lift and relocate his or her finger, but not so long as to delay a user who does in fact desire a reassignment of control gain based upon a new finger placement. The time period may be, for example, from about 100 to about 500 ms, and is preferably user adjustable. This time period, if provided, may also function to prevent dragged items from being dropped and/or deselected.

In a preferred embodiment, the outermost speed zone 32 has the highest control gain configuration. This conforms to the current touchpad use since most long distance cursor excursions are executed from the edge of the touchpad so that the maximum touchpad area may be traversed before the edge of the touchpad is reached. The innermost speed zone 36 is preferably assigned the lowest control gain configuration to provide for fine cursor control. This provides the advantage of allowing the cursor to be moved in all directions as would be common in situations involving the use of fine cursor movements, such as graphics creation or editing. Intermediate speed zone 34 (FIG. 3) is associated with a control gain configuration somewhere between that of zone 32 and zone 36. Zone 34 will have a control gain suited for the most common or routine cursor excursions, which typically involve intermediate cursor distances and require only intermediate positioning accuracy. Cursor control tasks suitable for the intermediate zone 34 typically involve less than full screen cursor distances and moderately sized cursor positioning targets. Representative tasks include button, icon, window, menu item, or other object selection and navigation of window or menu hierarchies.

The touchpad according to the present invention preferably employs an insulating covering. The covering may be a thin sheet of Mylar or the like to protect the sensors. Where the touchpad is of the capacitance sensing type, the covering also serves to facilitate the capacitive coupling between a finger or other object and the sensing matrix. Preferably, the covering is not smooth or glossy, but rather, has a finely textured finish that aids a user's finger in gliding over its surface.

Optionally, the covering has indicia to make the speed zone borders visually identifiable and distinct. Such indicia may include graphics such as imprinted lines along the borders of the different zones, shading or coloration differences demarcating the speed zone borders, and the like. The different zones may also contain text or graphical icons which may serve decorational as well as informational purposes. For example, the zone associated with low control gain could have a symbol that evokes imagery of slowness, such as a tortoise. The zone associated with the highest control gain could have a symbol that evokes imagery of speed, such as a hare.

As an addition or alternative to the graphical indicia, the covering may have differential texturing that allows a user to tactually discern the speed zone in which a finger located. Differential texturing provides awareness of the current speed zone without requiring a user to look away from the screen. The differential texturing of the touchpad surface may be accomplished by a number of methods including, (1) molding the textures into the surface, (2) abrading the surface of one or more of the speed zones to provide textures which can be differentiated by touch, (3) embossing the surface, (4) adhering tactual features to the surface, (5) providing a slight elevation or depression marking the border between speed zones, and (6) any combination thereof. In addition to surface texture, other tactually discernable indicia include, for example, braille characters, raised text, and the like, which may likewise be formed, adhered, embossed, etc., thereon. Any of such tactual features should be discernable without interfering with cursor control. The tactual features may also be used in combination with the visual indicia described above. Advantageously, the differential texturing may itself provide sufficient variation in light reflective properties so as to be visually discernable.

In another aspect of the present invention, a visual on-screen cue is optionally provided to indicate the speed zone currently governing the control gain configuration. For example, graphical indicia indicating the current speed zone may be displayed on the computer screen. Such indicia are preferably displayed unobtrusively, such as in a corner of the screen, on a menu bar or task bar, etc. Another example of such a visual cue is a change in cursor appearance based on the currently governing speed zone. While not intended to be limiting, exemplary changes in cursor appearance include changes in cursor size, color, shading, shape, or other characteristics. Such changes provide a visual indication that a change in control gain has occurred and may also provide visual feedback as to which control gain setting is in effect. For example, it may be advantageous to provide a large cursor when the high control gain configuration is activated, thus making the cursor easier to see and follow when moving at high speeds. Also, cursor on-screen persistence or cursor trails may be provided to make a cursor easier to track visually at high speeds. Also, the cursor may change shape according to the control gain setting, for example, becoming a cross-hair type of pointer when a low control gain is selected. The changes in cursor characteristics may also be temporary. For example, the cursor may be made to blink or temporarily change color, size, or shape whenever a new speed zone is selected. Most advantageously, the cursor characteristics for each speed zone are user selectable.

Similarly, audible cues as to which speed zone is governing the cursor control gain may optionally be provided. For example, tones or beeps of different pitch or otherwise distinct sounds may be provided to indicate a change in control gain configuration.

Tactile and audible cues as to speed zone location and selection provide the advantage of allowing the present touchpad to be used without requiring the user to look away from the screen or keyboard. Furthermore, tactile and audible cues are also useful in aiding visually impaired persons in the task of cursor control. Therefore, the touchpad according to the present invention may also be advantageously employed in conjunction with other known methods of enabling visually impaired users to locate and guide the cursor during an interactive computing session.

FIG. 4 illustrates an embodiment of the invention wherein a continuum of control gain settings is used rather than the discrete speed zones as shown in FIGS. 2 and 3. FIG. 4 depicts a graph of control gain settings as a function of the distance of the initial finger touch down from the center of the touchpad. When a finger is placed close to the center, a low control gain for fine cursor control governs the cursor movement. The control gain increases when the initial finger placement is closer to the edge of the touchpad. The control gain that is set in response to the initial finger touch down may be a simple tracking rate or may be an acceleration profile. The curve 40 shown is exemplary only and is not limited to the particular slope and concavity depicted. For example, the curve 40 may be linear or may be a curve having a different slope or concavity from that shown. The range of control gain settings is preferably user adjustable. By way of comparison, dashed line 42 illustrates the control gain setting versus initial finger placement for a touchpad of the present invention having three discrete speed zones such as that shown in FIG. 3.

Figure 5A:
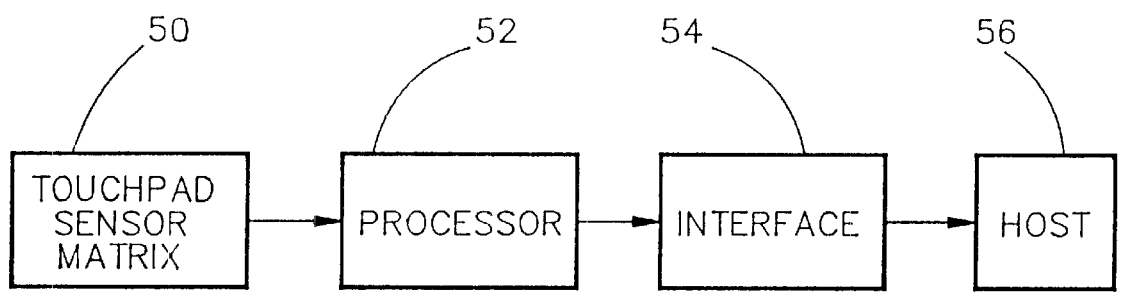
FIG. 5A is a block diagram of a preferred embodiment of the present invention.

Referring now to FIG. 5A, there is shown a block diagram of the touchpad apparatus according to the present invention. Touchpad sensor matrix 50 generates an electrical signal representative of the row and column of a user's input on the touchpad. The electrical information is sent to a processor 52, such as a microprocessor or microcontroller for conversion to an x-y position tracking data packet which is sent to the host computer system 56 via interface 54. The data packets will also include button state information. Microprocessor 52 may determine x-y coordinates by polling or scanning row and column matrix electrodes sequentially or simultaneously. Interface 54 is preferably an input interface that provides data communication according to a conventional standard, such as (1) a serial port, (2) a motherboard mouse port or a PS/2-type port, (3) an ADB port, (4) a USB port, or (5) an interface board that communicates with the device driver across the main motherboard bus, and the like. Interface 54 may employ an electrically conductive connecting cable or may employ a wireless link including, but not limited to an IR, RF, optical, including fiber optic, or ultrasonic link, and the like.

Figure 5B:
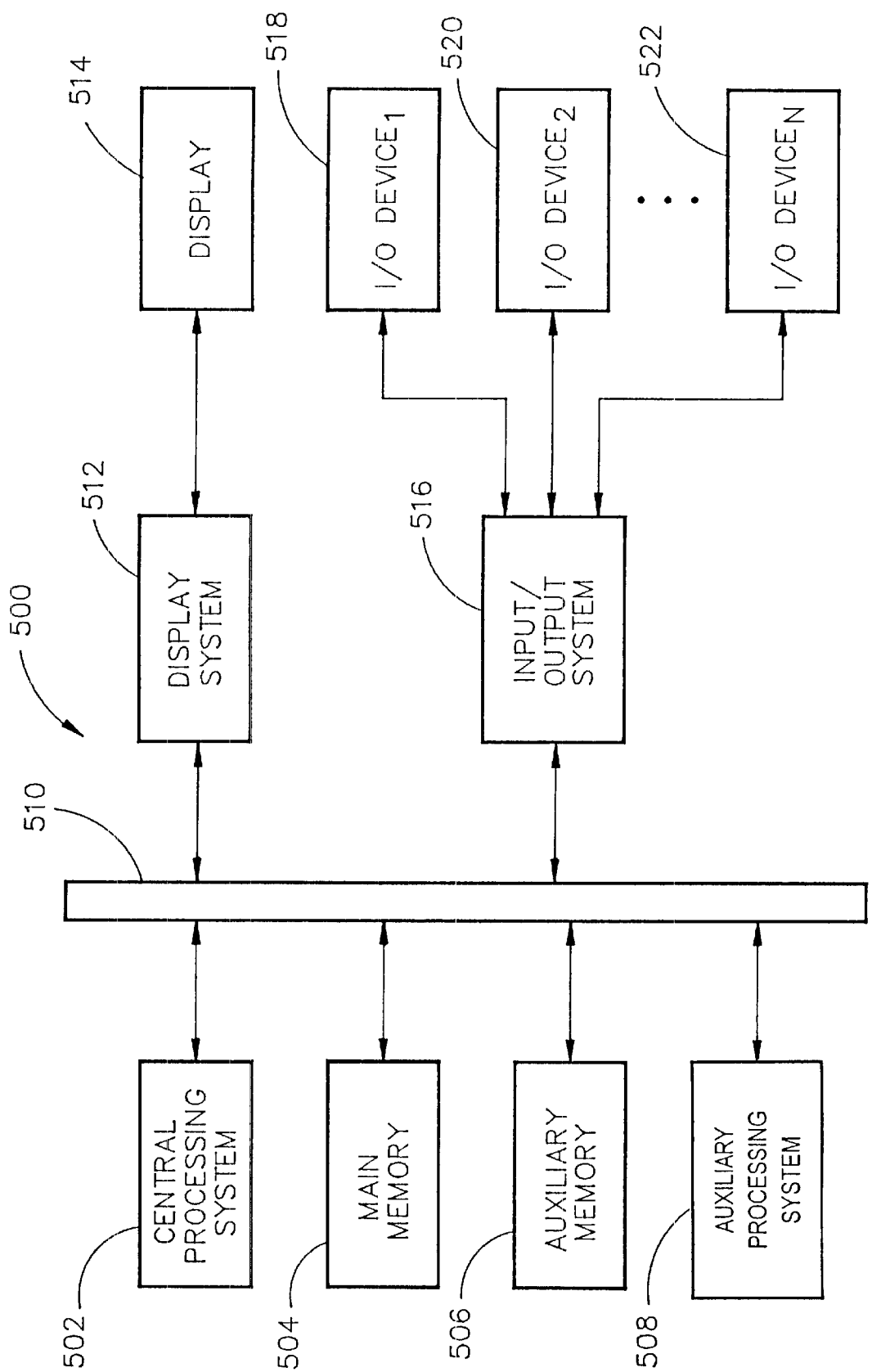
FIG. 5B is a block diagram of a computer system operable to embody the present invention.

Referring now to FIG. 5B, an information handling system operable to embody the present invention is shown. The hardware system 500 shown in FIG. 5B is generally representative of the hardware architecture of a computer-based information handling system of the present invention. The hardware system 500 is controlled by a central processing system 502. The central processing system 502 includes a central processing unit such as a microprocessor or microcontroller for executing programs, performing data manipulations and controlling the tasks of the hardware system 500. Communication with the central processor 502 is implemented through a system bus 510 for transferring information among the components of the hardware system 500. The bus 510 may include a data channel for facilitating information transfer between storage and other peripheral components of the hardware system. The bus 510 further provides the set of signals required for communication with the central processing system 502 including a data bus, address bus, and control bus. The bus 510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 500 include main memory 504, and auxiliary memory 506. The hardware system 500 may further include an auxiliary processing system 508 as required. The main memory 504 provides storage of instructions and data for programs executing on the central processing system 502. The main memory 504 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 506 provides storage of instructions and data that are loaded into the main memory 504 before execution. The auxiliary memory 506 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 506 may also include a variety of nonsemiconductor-based memories, including, but not limited to, magnetic tape, drum, floppy disk, hard disk, optical laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 500 may optionally include an auxiliary processing system 508 which may include one or more auxiliary processors to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 500 further includes a display system 512 for connecting to a display device 514, and an input/output (I/O) system 516 for connecting to one or more I/O devices 518, 520, up to N number of I/O devices 522. The display system 512 may comprise a video display adapter having all of the components for driving the display device, including video memory, buffer, and graphics engine as desired. Video memory may be, for example, video random access memory (VRAM), synchronous graphics random access memory (SGRAM), windows random access memory (WRAM), and the like.

The display device 514 may comprise a cathode ray-tube (CRT) type display such as a monitor or television, or may comprise an alternative type of display technology such as a projection-type display, liquid-crystal display (LCD), light-emitting diode (LED) display, gas or plasma display, electroluminescent display, vacuum fluorescent display, cathodoluminescent (field emission) display, plasma-addressed liquid crystal (PALC) display, high gain emissive display (HGED), and so forth.

The input/output system 516 may comprise one or more controllers or adapters for providing interface functions between the one or more I/O devices 518–522. For example, the input/output system 516 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, track ball, touch pad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electroacoustic transducer, microphone, speaker, audio amplifier, etc. The input/output system 516 and I/O devices 518–522 may provide or receive analog or digital signals for communication between the hardware system 500 of the present invention and external devices, networks, or information sources. The input/output system 516 and I/O devices 518–522 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/internet protocol (TCP/IP), serial line Internet protocol/point to point protocol (SLIP/PPP), and so on. It should be appreciated that modification or reconfiguration of the hardware system 500 of FIG. 5B by one having ordinary skill in the art would not depart from the scope or the spirit of the present invention.

Figure 6:
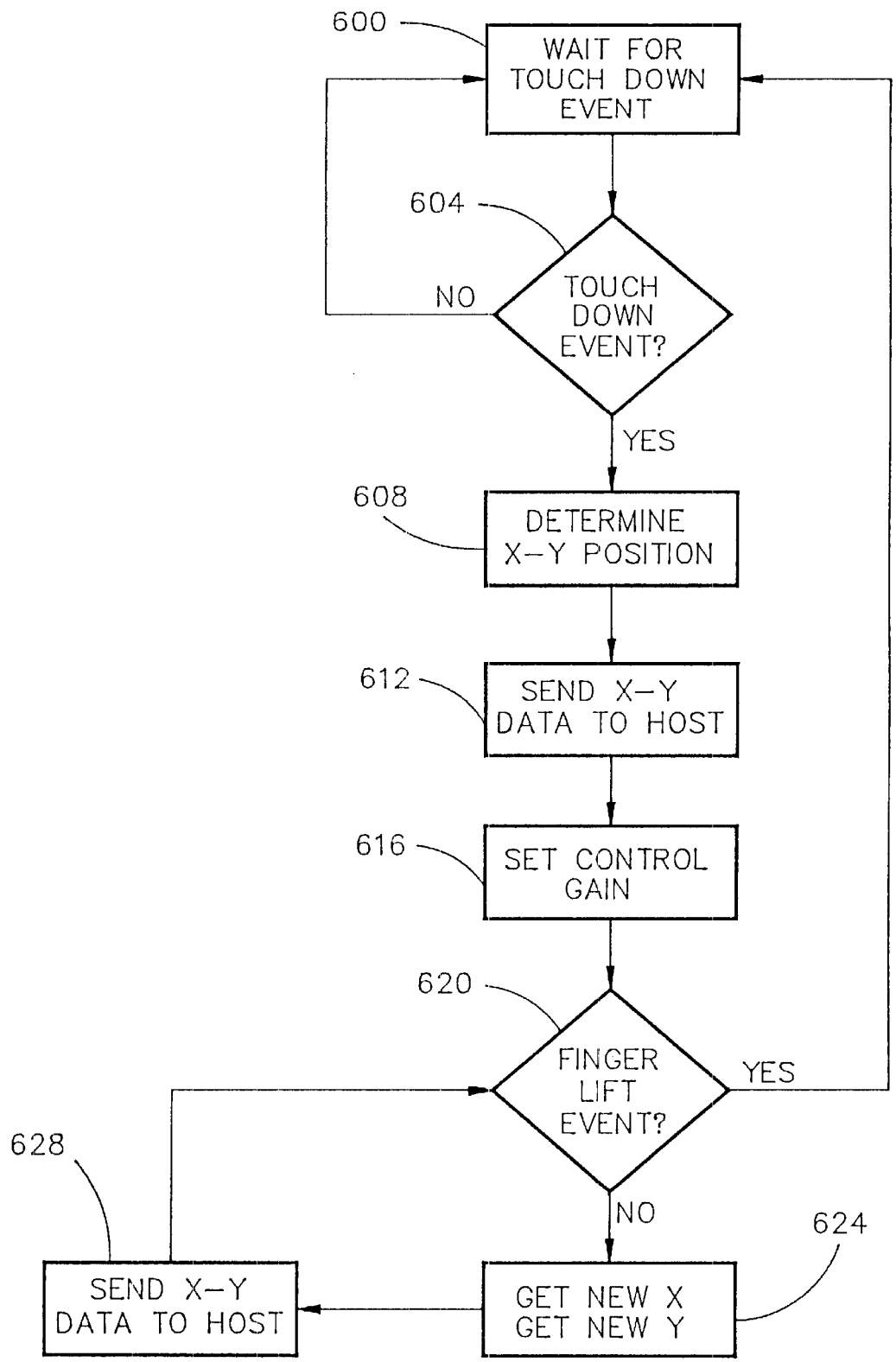
FIG. 6 shows a flow chart outlining the operation of the touchpad according to the present invention.

Referring now to FIG. 6, there is shown a flow chart outlining an exemplary embodiment of the operation of the present invention. In step 600, the system waits for a finger touch down event. In step 604, if a touch down event has occurred, the x-y coordinates of the touch down are determined in step 608. In step 612, a position data packet is sent to the host and in step 616 the control gain is configured according to the x-y position of the touch down. Step 616 may also optionally include any other changes desired to occur such as displaying an on-screen indication of the new control gain setting, changing the cursor appearance, etc. In step 620, it is determined if a finger lift event has occurred. As stated above, a finger lift event may be a simple finger lift or may require the finger to remain off the touchpad for some predetermined interval of time. If a finger lift event has occurred, the process returns to step 600 and waits for the next finger touch down event. If a finger lift event has not occurred, the current x-y finger position coordinates are determined in step 624, the x-y position data is sent to the host in step 628, and the procedure returns to step 620.

Figure 7:
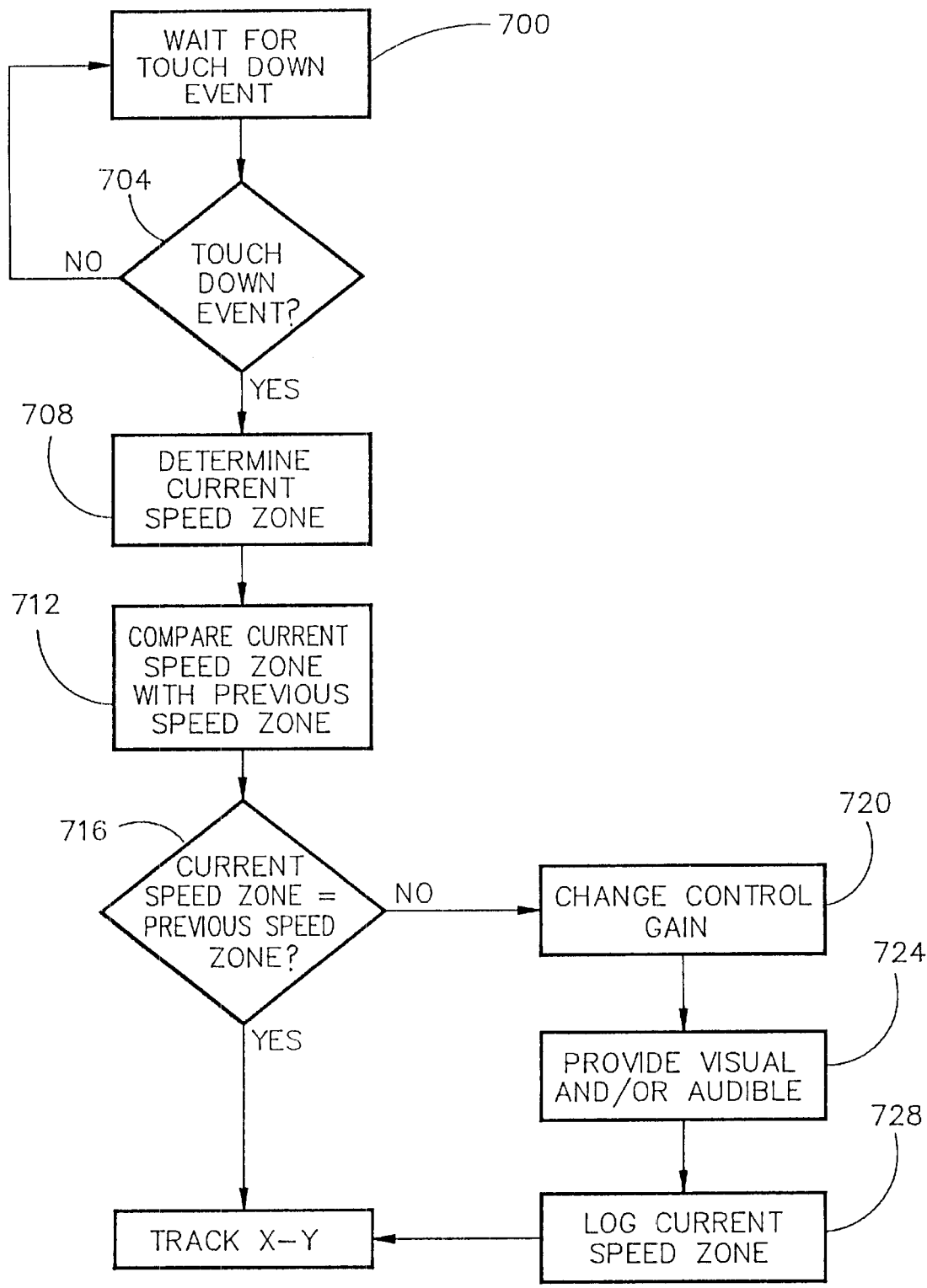
FIG. 7 shows a flow chart outlining an alternative method of operation of the touchpad according to the present invention.

Referring now to FIG. 7, there is shown a flow chart outlining an alternative embodiment of the operation of the present invention. In step 700, the system waits for a finger touch down event. In step 704, if a touch down event has occurred, the x-y coordinates of the touch down are used to determine the current speed zone in step 708. In step 712, the current speed zone is compared to the previously logged speed zone corresponding to the most recently selected speed zone. The previous speed zone is compared to the current speed zone is step 716. If the new speed zone is the same as the previous speed zone in step 716, no change in control gain settings is necessary and x-y information is tracked in step 732. If the new speed zone is different from the previous speed zone in step 716, a new control gain configuration is set in step 720. A visual or audible cue indicating a change in control gain setting may be provided in optional step 724. Step 724 may optionally further include any other changes desired to occur such as displaying an on-screen indication of the new control gain setting, changing the cursor appearance, etc. The new speed zone is logged in step 728 and the x-y position data is tracked and sent to the host in step 732. Coordinate tracking step 732 also includes the step of detecting whether a finger lift event has occurred in the same manner as described above in reference to FIG. 6.

In a further aspect of the invention, the touchpad according to the present invention may incorporate any other features conventional to touchpad devices. Such features include all manner of finger taps, button clicks, finger gestures, and combinations thereof, including, but not limited to, single taps, double taps, triple taps, quadruple and higher taps, tap and hold, tap and drag, etc. Other conventional features include button function assignability, jump to points, and an edge extension feature as discussed above.

In a preferred embodiment according to the present invention, a user may select the manner of operation of the touchpad with respect to such conventional touchpad features. For example, the operation of such features may be dynamically adjusted on the basis of the selected speed zone. Also, touchpad tapping force sensitivity may be dynamically adjusted on the basis of the selected speed zone. By way of example only, a user may prefer to use light, quick touches for fine cursor positioning and may wish to ensure that such light quick touches are not registered as taps. In this case, the user may specify decreased tapping sensitivity when the low control gain speed zone is in effect.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 504 of one or more computer systems configured generally as described in FIG. 5B. Until required by the computer system, the set of instructions may be stored in another computer readable memory such as the auxiliary memory of FIG. 5B, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by a user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. A method for configuring the control gain of a computer pointing device, said pointing device being of the touch sensing type employing a bounded plane sensing surface and said pointing device being further of type capable of providing x-y position information to a host computer system in response to the presence of an object touching said sensing surface, said method comprising the steps of:

dividing the sensing plane into a plurality of distinct regions and associating a given control gain setting for each region;

detecting the touch down of an object onto said sensing surface;

sending x-y position information of said touch down to said host computer system;

determining in which of said distinct regions said touch down occurred based on the x-y position information of said touch down; and configuring the pointing device according to the control gain setting associated with the distinct region in which it is determined that said touch down occurred.

2. The method according to claim 1 wherein said sensing plane is divided into two distinct regions.

3. The method according to claim 2 wherein said sensing plane is divided into two concentric regions comprising an inner region and an outer region.

4. The method according to claim 3 wherein said inner region is associated with a low control gain setting and said outer region is associated with a high control gain setting.

5. The method according to claim 1 wherein said sensing plane is divided into three distinct regions.

6. The method according to claim 5 wherein said sensing plane is divided into three distinct concentric regions comprising an inner region, a middle region, and an outer region.

7. The method according to claim 6 wherein said inner region is associated with a low control gain setting, said middle region is associated with an intermediate control gain setting, and said outer region is associated with a high control gain setting.

8. The method according to claim 7 wherein the control gain setting associated with each of said regions is independently selected from the group consisting of a simple cursor tracking setting and an acceleration based control gain setting.

9. The method according to claim 8 wherein the control gain setting associated with each of said regions is an acceleration based control gain setting.

10. The method according to claim 1 wherein the control gain setting associated with each of said distinct regions is independently selected from the group consisting of a simple cursor tracking setting and an acceleration based control gain setting.

11. The method according to claim 10 wherein the control gain setting associated with each of said distinct regions is independently selectable by a user.

12. The method according to claim 10 wherein the dimensions of said distinct regions may be adjusted by a user.

13. The method according to claim 10 wherein the dimensions of said distinct regions may not be adjusted by a user.

14. The method according to claim 1 wherein said touchpad is further of the capacitance sensing type and said object is a user's finger.

15. A method for configuring the control gain of a computer pointing device, said pointing device being of the touch sensing type employing a bounded plane sensing surface and said pointing device being further of type capable of providing x-y position information to a host computer system in response to the presence of an object touching said sensing surface, said method comprising the steps of:

defining a relationship associating control gain with touchpad touch down position;

detecting the touch down of an object onto said sensing surface;

sending x-y position information of said touch down to said host computer system;

determining the control gain setting using said x-y position information of said touch down; and configuring the pointing device with the determined control gain setting.

16. The method according to claim 15 wherein said relationship is defined such that the associated control gain increases as the distance from the touch down position to the center of the touchpad increases.

17. The method according to claim 15 wherein said relationship is defined such that the associated control gain increases as the distance from the touch down position to the nearest edge of the touchpad decreases.

18. In a computer system, a computer pointing device, said pointing device being of the touch sensing type employing a bounded plane sensing surface and said pointing device being further of type capable of providing x-y position information to said computer system in response to the presence of an object touching said sensing surface, said pointing device comprising:

a bounded plane sensing surface for controlling cursor movement on a display;

control circuitry connected to said sensing surface capable of determining the x-y position of an object touching said sensing surface;

an interface for communicatively coupling said control circuitry to a said computer system for sending x-y position information to said computer system; and means for selecting and setting a pointing device control gain configuration from among a plurality of control gain configurations, wherein said means for selecting and setting a pointing device control gain configuration is capable of selecting and setting a pointing device control gain configuration on the basis of the x-y position coordinates at which an object first touches said sensing surface.

19. The computer pointing device according to claim 18 wherein said sensing surface comprises an insulating sheet.

20. The computer pointing device according to claim 19 wherein said insulating sheet comprises visual indicia identifying surface regions in which a particular control gain configurations will be activated.

21. The computer pointing device according to claim 20 wherein said visual indicia comprises differential coloration.

22. The computer pointing device according to claim 20 wherein said visual indicia comprises differential shading.

23. The computer pointing device according to claim 20 wherein said visual indicia comprises symbology.

24. The computer pointing device according to claim 23 wherein said symbology comprises textual information.

25. The computer pointing device according to claim 20 wherein said insulating sheet comprises one or more tactually discernable features.

26. The computer pointing device according to claim 25 wherein at least one of said regions comprises a tactually discernable texture.

27. The computer pointing device according to claim 25 wherein said one or more tactually discernable features comprise one or more Braille characters.

28. The computer pointing device according to claim 18 further comprising means for providing visual indicia on a display screen corresponding to the selected configuration.

29. The computer pointing device according to claim 28 wherein said visual indicia comprises a change in cursor appearance.

30. The computer pointing device according to claim 30 further comprising an alphanumeric keyboard.

31. A computer system having pointing device, said pointing device being of the touch sensing type employing a bounded plane sensing surface and said pointing device being further of type capable of providing x-y position information to said computer system in response to the presence of an object touching said sensing surface, said pointing device comprising:

a bounded plane sensing surface;

control circuitry connected to said sensing surface capable of determining the x-y position of an object touching said sensing surface;

an interface communicatively coupling said control circuitry to said computer system; and means for selecting and setting a pointing device control gain configuration from among a plurality of control gain configurations, wherein said means for selecting and setting a pointing device control gain configuration is capable of selecting and setting a pointing device control gain configuration on the basis of the x-y position coordinates at which an object first touches said sensing surface.

32. The computer system according to claim 31 wherein said sensing surface comprises an insulating sheet.

33. The computer system according to claim 32 wherein said insulating sheet comprises visual indicia identifying surface regions in which a particular control gain configurations will be activated.

34. The computer system according to claim 33 wherein said visual indicia comprises differential coloration.

35. The computer system according to claim 33 wherein said visual indicia comprises differential shading.

36. The computer system according to claim 33 wherein said visual indicia comprises symbology.

37. The computer system according to claim 36 wherein said symbology comprises textual information.

38. The computer system according to claim 32 wherein said insulating sheet comprises one or more tactually discernable features.

39. The computer system according to claim 38 wherein said one or more tactually discernable features comprise differential texturing of different areas of the insulating sheet.

40. The computer system according to claim 38 wherein said one or more tactually discernable features comprise one or more Braille characters.

41. The computer system according to claim 31 further comprising means for providing visual indicia on a display screen corresponding to the selected configuration.

42. The computer system according to claim 41 wherein said visual indicia comprises a change in cursor appearance.

43. The computer system according to claim 31, wherein said computer system is a portable computer.

44. The computer system according to claim 31, wherein said computer system is a desktop computer.

45. An article of manufacture comprising:
a computer useable medium having a computer readable code means embodied in said medium for configuring the control gain characteristics of a computer pointing device of the type having a bounded plane sensing surface for detecting the x-y position coordinates of touch or pressure input upon said sensing plane, the computer readable program code in said article of manufacture comprising:
computer readable program code means to divide the sensing surface into a plurality of distinct regions, each of said distinct regions comprising a distinct set of x-y coordinates on said sensing plane;
computer readable program code means for causing the computer to associate each of said distinct regions with a particular control gain setting;
computer readable program code means for causing the computer to receive x-y coordinate information of a touch down of an object on said sensing surface from said pointing device;
computer readable program code means for causing the computer to determine which of said plurality of distinct regions the x-y coordinate information of said touch down falls within; and
computer readable program code means for causing the computer to configure the control gain in accordance with the control gain characteristics of that distinct region in which said touch down falls within.

46. A program storage device readable by a machine, tangibly embodying a program of instructions executable by the machine to perform method steps for configuring the control gain of a computer pointing device of the touch sensing type, said pointing device being of the type employing a bounded plane sensing surface and further being of the type capable of providing x-y position information to a host computer system in response to the presence of an object touching said sensing surface, said method steps comprising:
dividing the sensing plane into a plurality of distinct regions and associating a given control gain setting for each region;
detecting the touch down of an object onto said sensing surface;
sending x-y position information of said touch down to said host computer system;
determining in which of said distinct regions said touch down occurred based on the x-y position information of said touch down; and
configuring the pointing device according to the control gain setting associated with the distinct region in which it is determined that said touch down occurred.

47. The program storage device according to claim 46 wherein said sensing plane is divided into two distinct regions.

48. The program storage device according to claim 47 wherein said sensing plane is divided into two concentric regions comprising an inner region and an outer region.

49. The program storage device according to claim 48 wherein said inner region is associated with a low control gain setting and said outer region is associated with a high control gain setting.

50. The program storage device according to claim 46 wherein said sensing plane is divided into three distinct regions.

51. The program storage device according to claim 50 wherein said sensing plane is divided into three distinct concentric regions comprising an inner region, an middle region, and an outer region.

52. The program storage device according to claim 51 wherein said inner region is associated with a low control gain setting, said middle region is associated with an intermediate control gain setting, and said outer region is associated with a high control gain setting.

53. The program storage device according to claim 52 wherein the control gain setting associated with each of said regions is an acceleration based control gain setting.

54. The program storage device according to claim 46 wherein the control gain setting associated with each of said distinct regions is independently selected from the group consisting of simple cursor tracking and cursor acceleration based control gain.

55. The program storage device according to claim 54 wherein the control gain setting associated with each of said distinct regions is independently selectable by a user.

56. The program storage device according to claim 54 wherein the dimensions of said distinct regions may be adjusted by a user.

57. The program storage device according to claim 54 wherein the dimensions of said distinct regions may not be adjusted by a user.

58. The program storage device according to claim 46 wherein said touchpad is further of the capacitance sensing type and said object is a user's finger.

59. A computer pointing device, said pointing device being of the touch sensing type employing a bounded plane sensing surface and said pointing device being further of type capable of providing x-y position information to a host computer system in response to the presence of an object touching said sensing surface, said computer pointing device capable of identifying to a user the control gain characteristics of the pointing device on a visual and/or tactual basis, said computer pointing device comprising a bounded plane sensing surface and control circuitry for controlling cursor movement on a display, and an insulating sheet overlying said sensing plane, having graphical or tactual indicia thereon whereby distinct regions are associated with particular control gain settings, the indicia is correlated with the distinct regions, and the indicia serves to identify to a user the location on said sensing plane a finger first touches down and further serves to identify to a user selected control gain characteristics selected.

60. A method for imparting information to a touchpad user, said touchpad being of the touch sensing type employing a bounded plane sensing surface and said pointing device being further of type capable of providing x-y position information to a host computer system in response to the presence of an object touching said sensing surface, said computer pointing device capable of identifying to a user the control gain characteristics of the pointing device on a visual and/or tactual basis, said method comprising the steps of providing a bounded plane sensing surface and control circuitry for controlling cursor movement on a display, and providing an insulating sheet overlying said sensing plane, having graphical or tactual indicia thereon whereby distinct regions are associated with particular control gain settings, the indicia is correlated with the distinct regions, and the indicia serves to identify to a user the location on said sensing plane a finger first touches down and further serves to identify to a user selected control gain characteristics selected.

61. A method for configuring one or more operational features of a computer pointing device, said pointing device being of the touch sensing type employing a bounded plane sensing surface and said pointing device being further of type capable of providing x-y position information to a host computer system in response to the presence of an object touching said sensing surface, said method comprising the steps of:

dividing the sensing plane into a plurality of distinct regions and associating one or more operational feature settings for each region;

detecting the touch down of an object onto said sensing surface;

sending x-y position information of said touch down to said host computer system;

determining in which of said distinct regions said touch down occurred based on the x-y position information of said touch down; and configuring the pointing device according to said one or more operational feature settings associated with the distinct region in which it is determined that said touch down occurred.

62. The method according to claim 61 wherein said one or more operational features are selected from the group consisting of cursor control gain, tapping force sensitivity, tapping speed sensitivity, tapping lateral motion sensitivity, finger or stylus pressure sensitivity, button function assignment, tap function assignment, and any combination thereof.

63. The method according to claim 62 wherein said one or more operational features are selected from the group consisting of tapping force sensitivity, tapping speed sensitivity, tapping lateral motion sensitivity, finger or stylus pressure sensitivity, button function assignment, tap function assignment, and any combination thereof.

64. An article of manufacture comprising:

a computer useable medium having a computer readable code means embodied in said medium for configuring one or more operational features of a computer pointing device of the type having a bounded plane sensing surface for detecting the x-y position coordinates of touch or pressure input upon said sensing plane, the computer readable program code in said article of manufacture comprising:

computer readable program code means to divide the sensing surface into a plurality of distinct regions, each of said distinct regions comprising a distinct set of x-y coordinates on said sensing plane;

computer readable program code means for causing the computer to associate each of said distinct regions with a particular configuration for said one or more operational features;

computer readable program code means for causing the computer to receive x-y coordinate information of a touch down of an object on said sensing surface from said pointing device;

computer readable program code means for causing the computer to determine which of said plurality of distinct regions the x-y coordinate information of said touch down falls within; and computer readable program code means for causing the computer to configure said one or more operational features in accordance with the configuration associated with that distinct region in which said touch down falls within.

65. The article of manufacture according to claim 64 in said one or more operational features are selected from the group consisting of cursor control gain, tapping force sensitivity, tapping speed sensitivity, tapping lateral motion sensitivity, finger or stylus pressure sensitivity, button function assignment, tap function assignment, and any combination thereof.

66. The article of manufacture according to claim 65 wherein said one or more operational features are selected from the group consisting of tapping force sensitivity, tapping speed sensitivity, tapping lateral motion sensitivity, finger or stylus pressure sensitivity, button function assignment, tap function assignment, and any combination thereof.

67. A program storage device readable by a machine, tangibly embodying a program of instructions executable by the machine to perform method steps for configuring one or more operational features of a computer pointing device of the touch sensing type, said pointing device being of the type employing a bounded plane sensing surface and further being of the type capable of providing x-y position information to a host computer system in response to the presence of an object touching said sensing surface, said method steps comprising:

dividing the sensing plane into a plurality of distinct regions and associating with each region a given configuration setting for said one or more operational features;

detecting the touch down of an object onto said sensing surface;

sending x-y position information of said touch down to said host computer system;

determining in which of said distinct regions said touch down occurred based on the x-y position information of said touch down; and configuring the pointing device according to the configuration setting for said one or more operational features associated with the distinct region in which it is determined that said touch down occurred.

68. The program storage device according to claim 67 wherein said one or more operational features are selected from the group consisting of cursor control gain, tapping force sensitivity, tapping speed sensitivity, tapping lateral motion sensitivity, finger or stylus pressure sensitivity, button function assignment, tap function assignment, and any combination thereof.

69. The program storage device according to claim 68 wherein said one or more operational features are selected from the group consisting of tapping force sensitivity, tapping speed sensitivity, tapping lateral motion sensitivity, finger or stylus pressure sensitivity, button function assignment, tap function assignment, and any combination thereof.

* * * * *